Patented Apr. 6, 1937

2,076,443

UNITED STATES PATENT OFFICE 2,076,443

ALTERING GLAUCONITE

William McAfee Bruce, Mount Holly, N. J., assignor to The Permutit Company, New York, N. Y., a corporation of Delaware No Drawing. Application January 22, 1935, Serial No. 2,973

9 Claims. (Cl. 23—112)

This invention relates to altering glauconites; and it comprises a process of making from natural glauconite or greensand an altered product having a high base exchange value in water softening, said process being a combination of a drastic superficial attack upon glauconite granules by a hot acid solution under conditions extracting basic constituents reacting with acid, thereby heightening the silica content with increasing porosity and without loss of exchange power, followed by drying the granules and an alkalization with a solution containing caustic soda and sodium aluminate, said drying and alkalization being advantageously preceded by a wash with water hardened by containing calcium compounds, alkalization being then with an alkaline solution containing sodium chlorid; and it further comprises as a new article of manufacture the product of said process, being altered glauconite granules of a bright green color and of increased relative silica content and increased surface porosity carrying added soda and alumina and having high operating exchange value; all as more fully hereinafter set forth and as claimed.

Commercial glauconite is a greensand preparation in extensive use in the zeolitic process of softening water and has valuable characteristics for this purpose which are different from those of synthetic zeolites, such as those made in the wet and dry ways. In particular, glauconite is distinguished by a physical ruggedness giving great durability for continued use in water softening. Glauconite as found in nature is a complex mineral containing double silicates of iron and potassium or sodium and containing also a considerable amount of alumina with traces of other bases such as lime and magnesia. Natural glauconite prior to use is usually subjected to some sort of a treatment to stabilize its surface and to prevent changes in it by the action of water in the softener. Glauconite exposed to underground waters is in a different surface condition from glauconite after use for a time in softening water and these preliminary treatments are usually advisable. Very many methods of stabilizing natural glauconites have been proposed; and some are in use. Many methods have been suggested for also incidentally increasing the exchange power, but these are mostly impractical. Any improvement in exchange power resulting from these treatments is usually more or less transitory; all glauconites, after a period of use in softening water, tend to come to about the same exchange power; to the same steady state.

The quantitative exchange power of glauconite or a zeolite is difficult to determine with accuracy. Comparable results can only be obtained by consideration of many variables. Grain size, depth of bed, velocity of flow, amount of salt, etc., are all factors. The total exchange power can be determined by treating with hard water to completely exhaust the softening power and then with a sufficient amount of salt solution in regeneration to effect complete removal of calcium and magnesium taken up by the glauconite. The values so obtained are, however, of little practical use, since in a commercial softener the amount of salt used cannot be unlimited. Nor are the physical and other conditions in an actual working softener those which obtain in a laboratory test; using a narrow experimental tube, for example. Commercially, it is necessary to deal with the average exhaustion per unit volume of a zeolite bed of considerable width and depth. In practice, the upper layers of the zeolite bed, in a downflow softener, are more quickly exhausted than the lower layers and softening is usually stopped before complete exhaustion of the lowermost layers. In commercial operation, it is found that variations in the amount of salt used in regeneration influence the apparent exchange power materially. For this reason, laboratory determination of exchange power using definite, limited amounts of salt in regeneration, have more practical value. This method may be here called determination of the operating exchange value. In the present invention, an altered glauconite is made possessing higher operating exchange value than that of the best grades of glauconite preparations on the market; the increase, as a matter of fact, being great enough to require extensive modification in the design of commercial softening apparatus using it. The behavior towards salt solution is quite unlike that of unaltered glauconite; being characteristic. The improvement is not transitory, the new values persisting in use.

As stated, natural glauconite is usually treated in some way prior to use. These treatments, while stabilizing the surfaces of the granules, do not materially attack them or alter their appearance or other properties. The granule remains substantially unchanged. All glauconite treated in these ways, after a period of use, as stated, comes to a steady state in which the operating exchange value is not very different as between different glauconite preparations. A cubic foot of a typical commercial glauconite in a commercial type of downflow softener can be relied upon to remove about 3000 grains of hardness, calculated as $CaCO_3$, from flowing water with the use of 1.4 pounds of salt in regeneration. In laboratory operation using testing tubes, and with accurate control of conditions, this figure may rise to 3500 grains of hardness per cubic foot of glauconite regenerated with 1.4 pounds of salt. In commercial operation, it is found that if the stated amount of salt used in regeneration is doubled, there is somewhat more exchange power, but not much more. In the laboratory test, the increase will be from about 3500 to about 4200 grains upon increase of salt consumption from 1.4 pounds to 2.8 pounds per cubic foot. The use of four times as much salt, or 5.6 pounds, may raise the exchange power to 4500 grains.

It has been found that by certain drastic treatments of natural glauconite effecting extensive alteration of the granules, a new type of material is made in which the operating exchange capacity is raised 50 per cent or more, as compared with the original glauconite in the steady state; meaning that with the same quantity of salt used in regeneration per cubic foot of the new softening agent, about 50 per cent more water can be softened between regenerations than is the case with commercial water softening glauconites. In other words, using a given amount of salt in regeneration, the operating exchange power of the new material is enormously higher than that of the old. This increased exchange capacity in operation is associated with a sharp increase of exchange value with increasing amounts of salt used in regeneration; results in this respect being of a kind entirely different from those obtained with unaltered glauconite. Doubling the amount of salt in regeneration may increase the operating exchange value by 60 per cent or more.

In another and copending application, Serial No. 676,548, filed by William McAfee Bruce and Ray Riley as joint inventors and whereon the present invention, in some respects, is an improvement, it is disclosed that natural glauconite which is extensively used in softening water, can be altered to a product having the new type of high operating exchange value by certain treatments attacking the surfaces of the granules. In said copending application, the specific process described and claimed is in several successive steps and involves a drastic attack on the glauconite granules by first heating to a high temperature under reducing conditions, and then by treating with strong caustic soda solution. After the final treatment, the granular material is washed and stabilized by treatment with various weak solutions. Said prior application describes but does not claim an alternative process in which the primary attack on the granules is with an acid; a drastic acid treatment being used in lieu of strong heating and this being followed by a drastic treatment with a hot caustic alkali solution.

I have found that glauconite granules can be given the new type of high operating exchange value without sacrifice of physical ruggedness or durability and a new and different kind of altered glauconite can be produced by operating in a somewhat different manner in which alkali is used in a manner less drastic. In the present invention, there is a drastic but superficial extraction by a hot acid solution followed in order by drying and an alkalization of granules with a solution containing caustic soda and sodium aluminate. The acid treatment induces an artificial porosity by extraction of basic constituents of the glauconite, leaving a heightened silica content but without loss of exchange power. The dried acid extracted material has less weight for a given volume than the original; the apparent specific gravity is less. The succeeding treatment reduces the porosity somewhat; the apparent specific gravity increases. In the pores is deposited sodium alumno-silicate formed by reaction of the aluminate contained in the alkali at the expense of residual silica left by the acid treatment. In the drying surfaces of pores enlarged by the acid treatment are further prepared for the subsequent treatment. In a sense, basic materials extracted by the acid are replaced by soda and alumina. The acid-extracted glauconite after drying is found to have a considerably increased base exchange power compared to that of the original glauconite. And with the after treatments the exchange power is still further increased by the deposit upon the enlarged pore surfaces of sodium aluminum silicate formed in situ from silica contained in the original glauconite. The combined treatment changes the dull green color of the original glauconite to a bright green and increases the ratio of contained silica.

Better results are obtained by charging the acid treated material with a certain amount of calcium (lime) prior to the alkalization. In this event, sodium chlorid (salt) is added to the impregnating solution, thereby exchanging the calcium taken up for sodium. The intermediate treatment may be with lime water. It is often sufficient, however, to use ordinary types of hard water containing calcium or magnesium as a hardness-giving constituent for washing the acid treated material. The acid attack increases the pore surface of the granules and the succeeding deposit of sodium alumino-silicate supplies exchangeable sodium to the pore surfaces.

Operating in this way, using an acid treatment followed by a caustic soda-sodium aluminate treatment, with or without intermediate treatment with water containing lime, an altered glauconite is obtained having like characteristics to those set forth in said copending application but different in structure and composition. Among these characteristics, increased operating exchange value, increased porosity and great durability are outstanding.

In attacking greensand with sulfuric acid, or any other acid, the action may go so far as to leave only a silica skeleton, the bases being wholly extracted. Under some conditions, even much of the silica will go into solution. No such fargoing treatment is here contemplated; it is merely desired to produce a drastic but superficial attack on the glauconite granules with partial extraction of basic constituents from the pore surfaces, leaving the granule as a whole having its original structural rigidity and strength, but with increased porosity. The inherent mechanical strength of glauconite is of great importance in operating a zeolite softener. It is therefore, as stated, important in the present invention not to carry the attack to a point where the glauconite granule as a whole suffers. These softeners may operate over a period of years with alternate softening and regeneration and there should be little loss of mineral by abrasion; nor should there be any formation of mud. Mechanically considered, the standard glauconite preparations on the market are satisfactory in these respects.

For the acid treatment, hot diluted sulfuric acid in a strength from 10 to 35 per cent is satisfactory. It extracts basic matter from the granule surfaces without breaking down the whole granule. The proportion of acid relative to the glauconite treated may be between 8 and 45 per cent by weight. The stronger the acid and the greater the relative quantity used, the more the porosity is increased. In succeeding treatment there is a greater deposition of alumino-silicate. Too great a strength and quantity of acid however may give an attack upon the glauconite which is too fargoing and result in a physically weakened product and in loss of exchange power. Usually the acid treatment itself increases the exchange power. For most glauconites about 15 to 20 per cent of $H_2SO_4$ in a strength of 25 to 35 per cent gives excellent results in increased operating exchange value without sacrifice of physical ruggedness in the product.

Instead of sulfuric acid, other strong mineral acids such as hydrochloric acid may be used but sulfuric acid is the most convenient and usually the cheapest acid to use. Its chemical properties are also right; it is easier to obtain just the actions wanted.

Drying after the acid treatment appears to be quite advantageous in securing the material here wanted: granules of enlarged porosity impregnated with a zeolitic material formed upon the pore surfaces by reaction of the silica set free in the acid treatment.

For impregnation of the acid-treated glauconite, the dried material may be treated with a small amount of a solution containing caustic soda and sodium aluminate in amounts corresponding to weight ratios of 10 to 14 per cent of the original glauconite. Concentrations of about 10 per cent of each chemical in the impregnating solution are satisfactory. When the acid-treated glauconite has been washed with hard water prior to drying, thus converting the base exchange material to the calcium (or magnesium) phase, common salt is then added to the impregnating solution in an amount about equal to that of the caustic soda, that is, 10 to 14 per cent of the original glauconite.

It is sometimes advantageous to form the sodium aluminate in place by soaking the dried material first in aluminum sulfate solution and then in caustic soda solution. In so working the common salt is advantageously added to the aluminum sulfate solution.

In what is regarded as an advantageous embodiment of this invention, clean, washed, commercial glauconite, or greensand in granular form, is extracted with hot dilute sulfuric acid as a first step. It is desirable to use little agitation in this extraction to avoid breaking down the granules. It is desirable to use a washed material which has been screened to about 50 mesh; that is, using screens with openings of 0.297 mm. Good results are obtained by heating the washed sand to about 100° C. for about an hour, using 40 to 100 cc. strong sulfuric acid (94 per cent), and about 0.5 kg. of water per kilogram of glauconite. After the acid treatment the grains are washed in water to remove excess acid and are then dried and impregnated with a solution containing caustic soda and sodium aluminate. Still better results are obtained when the acid-extracted glauconite is charged with lime or magnesia, either or both, by treatment with lime water or by washing with hard water before drying and when some common salt is added to the solution of caustic soda and sodium aluminate used for impregnation. After the impregnation, the product is washed and may then be stabilized by successive washings with weak solutions of silicate of soda and of aluminum sulfate with intermediate washings in water.

In impregnating the acid-treated pore surfaces of glauconite granules with sodium alumino-silicate as described, it has been found particularly advantageous to use a volume of solution for this impregnation about equal to the volume of the pores in the acid-treated granules. This method of procedure gives an economy in use of impregnating reagents, caustic soda, sodium aluminate etc., much better than that obtained by immersing the granules in an excess of the impregnating solution. The method has been found to aid materially in development of exchange power by formation on the enlarged pore surfaces of impregnant base exchange or zeolitic compounds.

In the following two examples, specific embodiments of the invention are described:

*Example 1*

A cubic foot (about 98 pounds) of dry raw, washed greensand or glauconite free of clay and other impurities is screened 20–50 mesh to eliminate coarse and fine particles which would only consume acid, serve no useful purpose and involve handling. The 20–50 mesh material is placed in a steam jacketed horizontal, lead lined rotary autoclave. Then 20 pounds of 60° Bé. (78 per cent) $H_2SO_4$ and 30 pounds of water are added to the greensand and the entire charge of sand, acid and water are brought to a temperature of 200–220° F. while the autoclave is slowly revolved. The temperature is maintained for about an hour and then the contents of the autoclave are allowed to slowly cool or else cooled by running cold water through the steam jacket of the autoclave. The acid treated sand when washed and dried weighs about 85 pounds per cubic foot. It has an operating exchange value around 3200 grains $CaCO_3$ equivalent per cubic foot with 1.4 pounds salt used in regeneration. This exchange value is somewhat higher than that of the original glauconite. The acid solution is removed from the charge of sand by decantation and the acid sand is transferred to a wash tank containing an inlet for hard wash water, a strainer distribution system covered with about 12 inches of gravel, all in the bottom of the wash tank. The acid sand is placed on the gravel and hard water is introduced at such a flow rate that the bed of greensand is in suspension to facilitate thorough washing which is continued until the greensand is washed free of acid and is converted into the calcium or calcium and magnesium form, depending on the type of hardness in the hard wash water. This washed wet greensand is then artificially dried to remove free moisture (but not combined water), in the greensand and is then placed in a revolving concrete mixer. As the conrete mixer revolves, 6 liters of a solution containing 1.25 pounds NaCl, 1.75 pounds NaOH and 1.75 pounds sodium aluminate (40 per cent $Na_2O$ and 50 per cent $Al_2O_3$) is slowly sprayed on the sand, about 15 minutes being required for the introduction of the alkalization chemicals. The alkalized sand is then again placed in the wash tank referred to above and steamed with live steam for about 20 minutes and then washed as before to remove the slight excess of free alkali from the alkalized, steamed sand. The product is now ready for use. In a dry state it weighs about 90 pounds per cubic foot. The original glauconite contained 50 per cent silica on a dry basis. The altered product shows 60 per cent silica, has a bright green color and an operating exchange value about 4800 grains CaCO3 per cubic foot with 1.4 pounds salt, increasing to over 6200 grains with 2.8 pounds salt used in regeneration.

This product can be stabilized further by washing with a hot 3° Bé. water glass solution, using 3 pounds commercial water glass per cubic foot of greensand. After the washing with the dilute silicate solution it is washed with water and then the silicate washed sand is further washed with a 2° Bé. cold alum solution using a pound of commercial alum (sulfate of alumina) per cubic foot of sand. The alum solution is removed by a water wash which is continued until all traces of alum are removed.

*Example 2*

A cubic foot of raw washed granular glauconite similar to that used in Example 1 is placed in a rotary, horizontal lead-lined autoclave and 22 pounds of 60° Bé. H2SO4 with 30 pounds of water are added to it. The contents of the autoclave are heated to 200-220° F. and maintained at the temperature for 1 to 2 hours. The contents of the autoclave are cooled below the boiling point either by allowing to stand or by bringing cold water in contact with the heating surface of the autoclave. The acid solution is separated from the acid extracted granules by decantation or other suitable means and the acid treated material is transferred to a wash tank constructed as described in Example 1. The granules are washed with water containing alkaline hardness or with lime water followed by rinsing until all the acid is removed and there is a conversion into a calcium or magnesium zeolite. The wet material is removed from the wash tank and thoroughly dried to remove all free moisture. The dry granules are then placed in a revolving concrete mixer and 6 liters of alum solution containing 6.7 pounds of commercial Al2(SO4)3 18H2O is slowly sprayed on the material in the mixer. The granules from this mixer are then thoroughly dried and while hot are dumped into an open steam jacketed kettle containing 6.35 gallons of a warm caustic soda solution of about 60° C. containing 5.3 pounds of dissolved NaOH. The mixture is boiled 20 minutes. The supernatant solution is removed and the alkaline product transferred to a wash tank and thoroughly washed to remove any free caustic. The material is then ready for use. If further stabilization is desired it is carried out as described in Example 1.

While I have described the present method as applicable to the conversion of glauconite into a new base exchanging substance of different and bettered base exchanging properties, I find that the use of an alkaline aluminate solution is useful with other acid treated base exchange substances. It may, for example, be used with clay which has been extracted with sulfuric acid and with high ash lignites which have been treated with sulfuric acid. In these embodiments of my invention the general process is the same: the material is extracted with sulfuric acid, washed, treated with hard water, dried and finally treated with an alkaline solution of sodium aluminate, a solution containing caustic soda in excess.

What I claim is:

1. In the manufacture of an altered glauconite having enhanced operating exchange value with retained physical ruggedness, a process which comprises digesting glauconite granules with acid in relative quantity and for a time such as to attack the granule surfaces and to increase the granule porosity by dissolving out a substantial portion of the basic constituents without decrease of exchange power, washing and thereafter developing an increased exchange power with decrease of porosity by impregnating the granules with a solution containing caustic soda and sodium aluminate.

2. In the first step of the process of claim 1, digesting the granules with hot diluted sulfuric acid.

3. In the process of claim 1, drying the granules after the washing and then moistening the granules with a solution containing caustic soda and sodium aluminate.

4. In the process of claim 1, washing the granules with water containing a compound of calcium in solution, drying the granules and then moistening with a solution containing sodium chlorid in addition to caustic soda and sodium aluminate.

5. In the alteration of glauconite to improve its operating exchange value, the process which comprises removing easily soluble constituents from the surfaces of glauconite granules by extraction with dilute sulfuric acid in amount and concentration sufficient to create porosity in the granules and insufficient to destroy exchange power, charging the acid extracted granules with exchangeable calcium and then treating with an alkaline solution of sodium aluminate containing also sodium chlorid to exchange sodium for calcium.

6. A base exchange material consisting of altered glauconite granules of increased porosity, base exchange value and relative silica content, said granules having pores formed therein by partial extraction of basic constituents with partial replacement thereof by sodium aluminum silicate formed in situ.

7. A base exchange material of high operating exchange value and consisting of altered glauconite granules of increased surface porosity produced by partial extraction of basic constituents with partial replacement thereof by addition of soda and alumina.

8. A process of altering base exchange silicate materials to increase base exchange values which comprises extracting granules of the material with a solution of sulfuric acid in an amount from 8 to 45 per cent by weight of the material and in a concentration from 10 to 35 per cent of the solution, the amount and concentration of the acid being sufficient only to partially extract basic constituents, washing and thereafter treating the acid extracted granules with an alkaline solution of sodium aluminate.

9. In the process of claim 8, treating the acid extracted granules with a solution containing one or more alkaline earth salts and thereafter treating with an alkaline solution containing sodium chlorid as well as sodium aluminate.

WILLIAM McAFEE BRUCE.